United States Patent Office 3,369,977
Patented Feb. 20, 1968

3,369,977
METHOD AND MEANS FOR DESALINIZATION
Emile Bechard, 153 Blvd. Brune, Paris 14e, France
Continuation-in-part of application Ser. No. 121,958, July 5, 1961. This application Mar. 22, 1967, Ser. No. 625,228
11 Claims. (Cl. 203—11)

ABSTRACT OF THE DISCLOSURE

This invention is addressed to a method and means for the removal of dissolved solids in a liquid system and more particularly to the removal of solid salt particles from salt water solutions to effect the recovery of salt with the principal aim being addressed towards the preparation of fresh water. It concerns the treatment of the salt water in a turbo-generator wherein heat is transferred to the solution while the latter is subjected to centrifugal force while being advanced in confined radial paths axially along the generator whereby such centrifugal force coupled with the exponential increase in velocity by reason of the conversion of liquid to vapor operates to carry the formed solids through the generator to produce a product formed of vapor having the dissolved solids entrained therein as fine particles for subsequent separation by centrifugal force to leave the vapors free of solids for subsequent condensation to produce fresh water.

---

This is a continuation-in-part of my copending application Ser. No. 121,958, filed July 5, 1961, now abandoned, entitled "Method and Means of Solid-Liquid Separation."

This invention relates to a method and apparatus for separating the solute and solvent out of a solution. There are various processes where it is of interest to effect such separation in order to recover for subsequent use either the solvent liquid, or the solute solid in crystalline form, or both the liquid and the solid. The invention is applicable to all such processes. One especially important, though by no means exclusive, application of the invention is for the treatment of brine to produce substantially fresh water suitable for drinking, irrigation, and other purpose. Another important field of use is the extraction of various crystallizable substances, such as sugars, sulfates, and the like, from solutions thereof.

The invention is based in part on the consideration that the separation of the solvent and solute can easily be effected by conventional means, such as centrifuging, provided the solution has first been brought to a condition in which the solvent has been vaporized and the solvent vapor is flowing at a velocity high enough to entrain the solute crystals therewith. It is an object of this invention to achieve such a condition of the solution. Another object is to subject a solution to a combination of repeated applications of centrifugal force with a continuous progressive heating, in order to separate the solution into a vapor phase and a crystalline phase entrained therein, and thereafter to separate the phases as by centrifuging or the like.

Broader objects include the provision of improved method and apparatus for effecting solid/liquid separation with greater efficiency, simplicity and economy than was heretofore possible.

In accordance with the invention, there is provided a fluid flow path having a plurality of flow sections which alternately extend radially outward from, and radially inward toward, an axis. The solution to be separated is delivered, e.g., axially, into one end of the flow path. The flow path-defining means are, simultaneously, rotated bodily around said axis so as to expose the solution to a succession of centrifugal and centripetal motions. At the same time, heat is progressively applied to the solution as it flows along the flow path, conveniently by causing a heating fluid to flow around the revolving flow path-defining means in generally countercurrent relation to the solvent therein. The solvent is thus progressively vaporized and the solute, in crystalline form, is entrained with the solvent vapor. The mixed vapor and entrained crystal phases are continuously withdrawn from the said other end of the flow path, and passed to a conventional centrifugal separator.

An exemplary embodiment of the invention will now be described for purposes of illustration, but not of limitation, with reference to the accompanying drawings, wherein:

FIG. 4 is a diagrammatic view similar to that of FIG. 1 showing a modification in the system for desalinization; and FIG. 5 is a diagrammatic view similar to that of FIG. 4 showing a still further modification.

Figure 1:
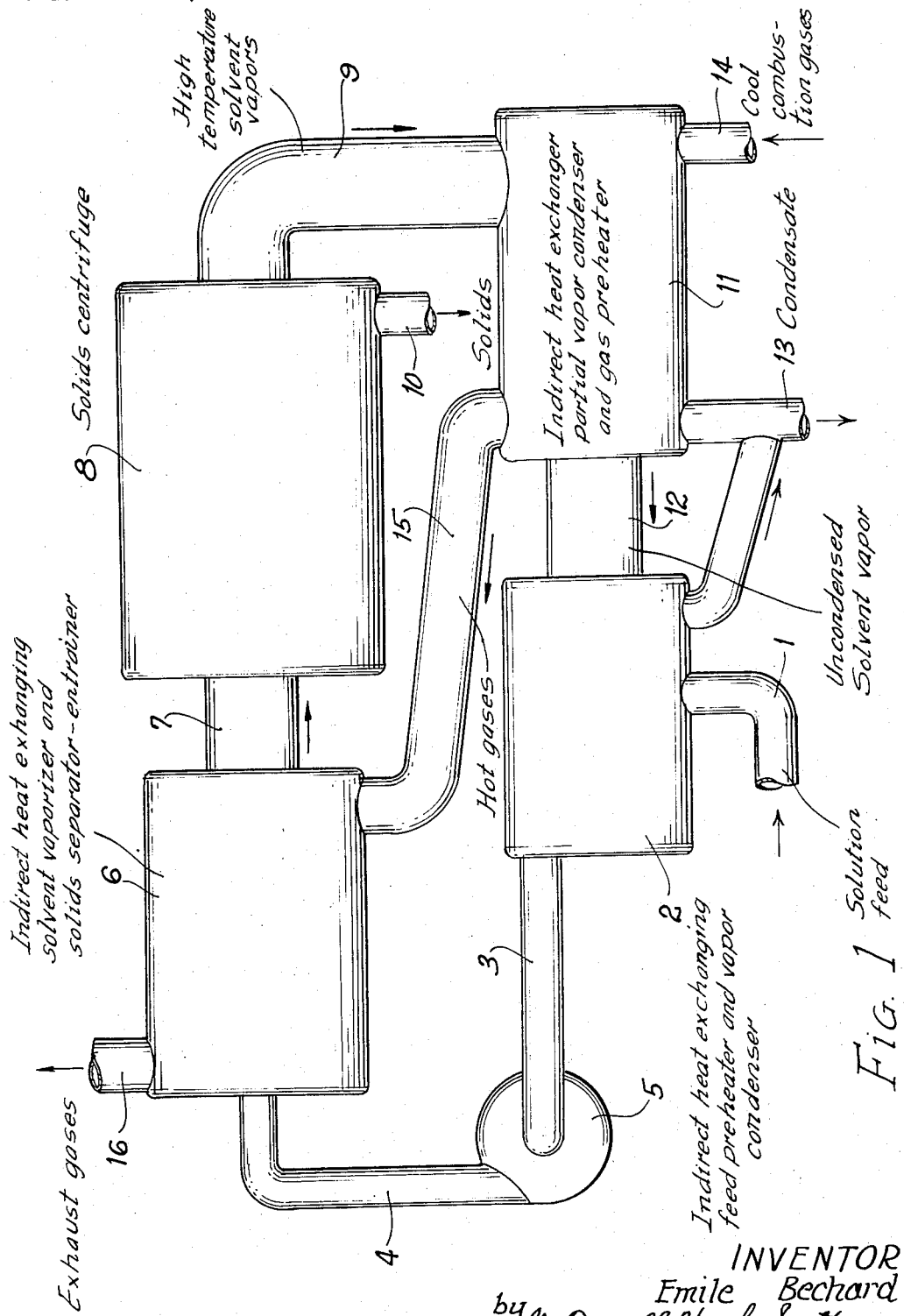
FIG. 1 is a simplified general view illustrating in outline the main units of separator plant according to the invention, and their interconnecting lines.

Referring first to FIG. 1, the solution to be separated is introduced into the system through the inlet line 1, into an indirect pre-heater unit 2 which is supplied with heating fluid in a manner later described. The preheated solution flows out of the unit 2 through the line 3 which is the intake line of a pump 5 serving to discharge the preheated solution, through line 4, into a novel separator unit 6 according to the invention which will be later described in detail. As will appear from the subsequent description, at the outlet 7 from the separator unit 6, the solution has effectively been separated into a solvent vapor phase in which are entrained crystals of the solid solute phase. This mixture is passed through line 7 into a conventional centrifuge or cyclone unit 8 from which the solvent vapor is discharged through the axial outlet line 9, while the solute crystals are collected peripherally by the solids outlet 10.

The high temperature solvent vapor discharged through centrifuge outlet line 9 is passed through a heat exchanger 11 in direct heat exchange relationship with cool combustion gas applied to exchanger 11 through the inlet 14. This combustion gas, preheated in exchanger 11 by the hot solvent vapors, is passed through line 15 to the unit 6 in which it serves to heat the solution as will be later explained, and is exhausted to atmosphere (or other disposal) through flue 16. The solvent vapors are partly condensed in exchanger 11 and the condensed solvent is discharged at 13. The reamining solvent vapor is passed to the first mentioned heat exchanger or preheater 2, where it serves to preheat the inflowing solvent, and in the process completes its own condensation, the condensate flowing out to the solvent collector line 13.

The novel separator unit 6 which forms the heart of the invention will now be described in detail with reference to FIG. 2, it being evident that the remaining component units of the plant may all be conventonal and therefore do not need further description.

Figure 2:
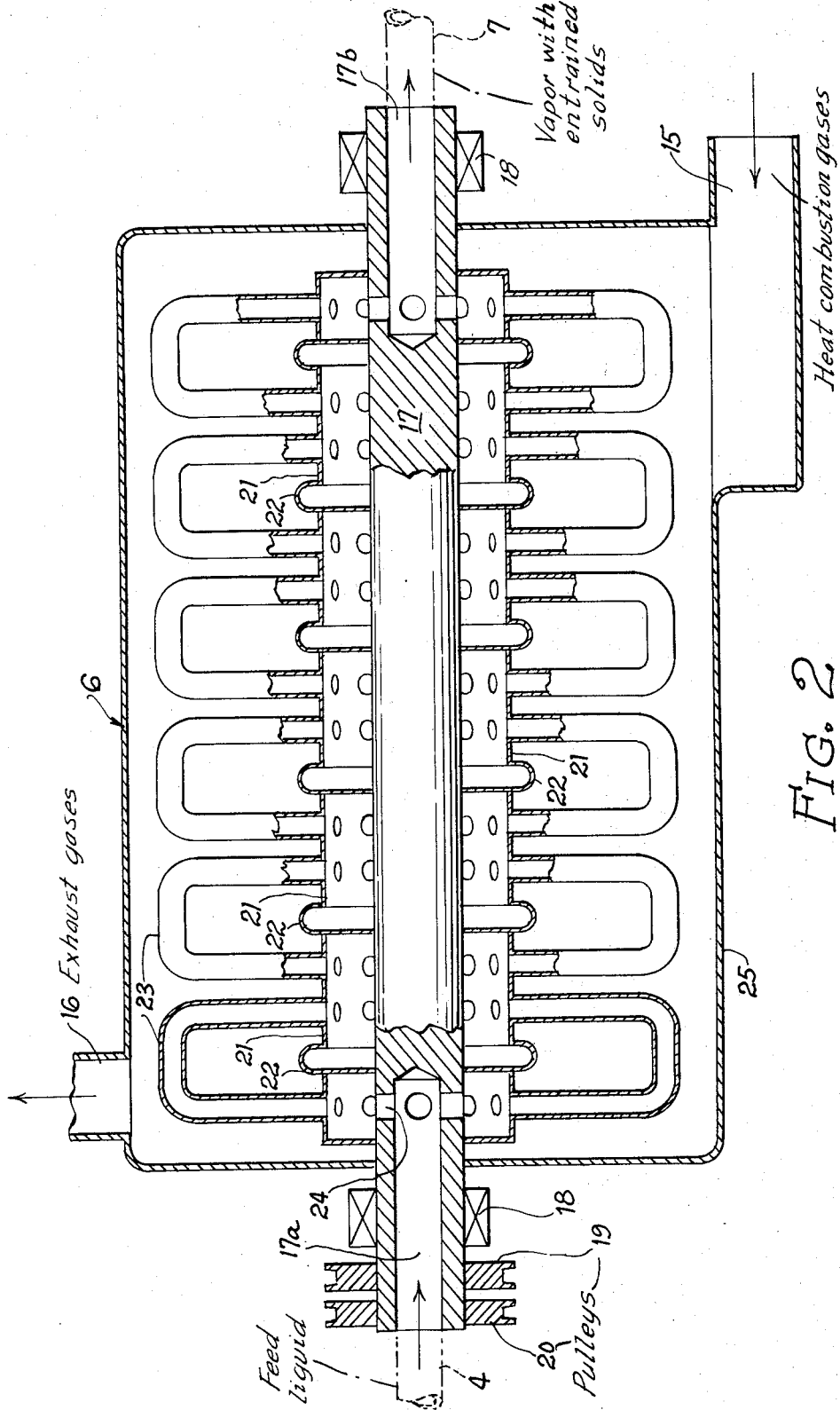
FIG. 2 is an axial sectional view of a novel apparatus unit according to the invention for separating the solution into a solvent-vapor phase and an entrained solute-crystal phase, which unit forms an essential part of the plant shown in FIG. 1.

As shown in FIG. 2, the unit 6 comprises an outer casing 25 in which is rotatably mounted a shaft 17 by way of spaced bearings 18. The shaft 17 is driven in rotation through any suitable means such as the drive pulley 19.

Another pulley 20 is shown secured on the shaft and serves to drive rotation for the pump 5, through transmission not shown.

The shaft 17 at its end portions is axially recessed to provide an inlet end chamber 17a at one side, the left side as shown, and an outlet end chamber 17b at the other side. Chambers 17a and 17b are adapted to be connected, through any appropriate rotatable sealing means not shown, with the lines 4 and 7 respectively of FIG. 1. Secured on the shaft 17 coaxially with it, and inside the casing 25, is a generally tubular enclosure or vessel which is shown as comprising a series of drum-like sections 21 positioned end to end and separated from one another by transverse disk-like partitions 22 which are formed to provide expansion joints between the adjacent drum sections, serving to take up differential expansion between the sections due to the temperature gradient that is set up through the sections as will be evident from the description of operation to follow. The endmost compartments defined in the end drums 21 are respectively connected with the inlet and outlet chambers 17a and 17b of the shaft 17, through radial ports formed in the shaft as at 24.

Each pair of adjacent compartments, defined by the drum sections on opposite sides of a partition 22, are interconnected by way of a plurality of U-shaped tubes 23, which have their respective legs connecting with the compartments of the pair as will be apparent from the drawing. Any desired number of such U-tubes may be provided. It may also lie within the scope of the invention to interconnect each pair of adjacent compartments 21 by means of a pair of generally annular, spaced, casing elements defining between them a continuous circumferential flow path having two generally radial portions respectively connected with the two compartments, in place of the plurality of separate tubes 23 shown. The important point is that the adjacent compartments 21 should be interconnected by a flow path such that the fluid in passing from one compartment to the next will follow first a radially outward, i.e., centrifugal path, and then a radially inward, i.e., centripetal path.

In operation, the solution, first preheated in unit 2 as described, is pumped by pump 5 at a relatively high flow rate into the inlet chamber 17a of unit 6, and enters the first drum compartment through ports 24. The pressure of pump 5 assisted by centrifugal force generated by the bodily rotation of the structure carried by shaft 17 forces the solution into the outgoing legs of the first tubes 23, filling the tubes, and the solution is then forced radially inward against centrifugal force into the next drum compartment 21, and proceeds in similar fashion down the array of drum compartments through the interconnecting U-tubes 23, and to the outlet chamber 17b.

As the solution is thus advanced rightward through the revolving structure, hot combustion gas is simultaneously circulated through casing 25, from inlet 15 to outlet 16 as earlier indicated, i.e., in countercurrent heat exchanging relation with the solution. Any desired combustion means, not shown, may be provided. Owing to the gradual heating thus provided, the solution is progressively vaporized in a highly uniform manner as it flows along its path, substantially without turbulence or the like. Thus the solvent is gradually vaporized out of the solution, so that the initial (leftward) stages of the circuitous flow path contain liquid solution, while the ultimate (rightward) stages contain solvent vapor, with a gradual transition between the two stages. In each of the stages, however, the fluid, whether liquid or vapor, is propelled at a cooler temperature and hence at a higher density by the pump pressure and centrifugal force over the radially outgoing leg of its flow path, and is then returned at a higher temperature and lower density over the ingoing leg to the next compartment. Thus owing to the progressive density reduction due to the heating, combined with the centrifugal acceleration imparted on each outgoing lap of its travel, the fluid is smoothly conveyed inward, centripetally to the next stage. This effect tends to cause a smooth and gradual distribution of densities in decreasing order along the successive stages of the flow path, which is a powerful aid to the vaporization of the solvent phase out of the solution.

At the same time, it will be noted that the gradual conversion of the solvent from the liquid to the vapor state is accompanied by a corresponding gradual increase in volume, and since the flow section provided through the system is substantially constant, this increase in volume must result in a gradual acceleration of the flow, so that the solvent vapor in the latter stages of the apparatus is traveling at a greatly increased velocity. The vaporization of the solvent has, of course, simultaneously resulted in a crystallization of the solute. Owing to the high flow velocity of the vapor in the latter stages of the system as just mentioned, the solute crystals formed are entrained with the vapor, forming a suspension therein, so that the effluent at 17a from the unit comprises a mixture of solvent vapor with entrain solute crystals. This mixture is then passed to the centrifugal separator 8 in which the solvent vapor and solute crystals are easily separated as earlier described.

It will thus be seen that the invention provides a novel and effective way of separating liquids and solids. While solutions are exclusively mentioned in the specification and claims, for brevity, and because the main applications of the invention relate to the separation of solutions, it will be understood that the separating process and apparatus described may be applicable to dispersions other than true solutions, and the term "solution" as used in the specification and claims should, therefore, be interpreted in this broadened means.

Figure 3:
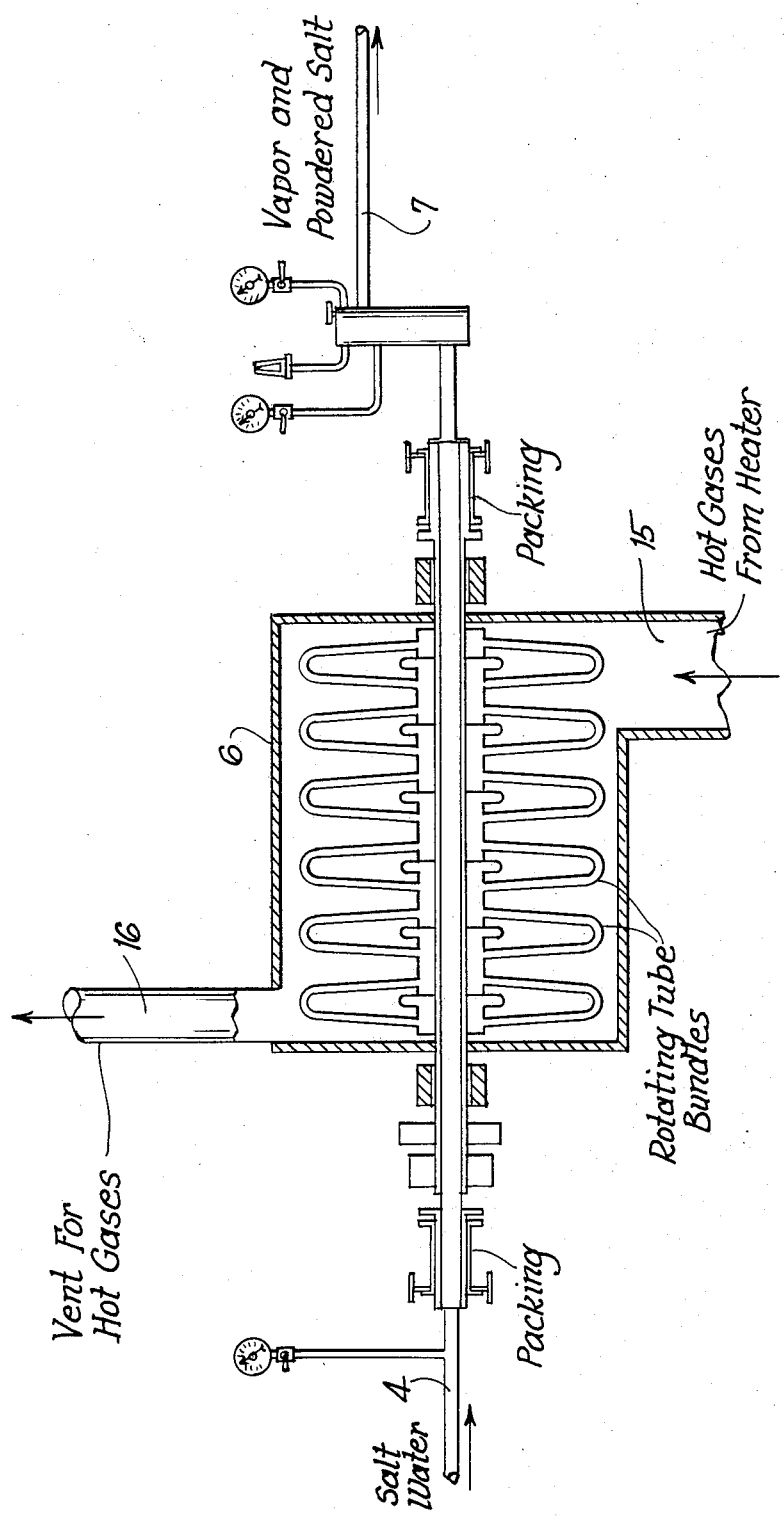
FIG. 3 is a schematic view of the turbo-generator arranged in a line for desalinization of sea water or brackish water.

While the invention has been described with reference to the separation of a solute-solvent system into solvent and dry solute, the described apparatus finds excellent use in desalinization to produce fresh water from sea water from which the salt content is eliminated or at least reduced to acceptable levels of less than 500 parts per million. For desalinization, the turbo-generator 6 can be arranged in the system, as illustrated in FIG. 3, to receive the preheated salt water at one end and to deliver water vapor with fine salt particles entrained therein through the line 7 for subsequent separation of the solid salt particles from the vapor by a suitable separator, such as the centrifugal separator 8.

In the described turbo-generator, the inverted circuits which correspond to a type of countercurrent flow between the hot gases entering at one end through the line 15 and issuing at the other end through the vent 16 and the salt water introduced at the other end through line 4 for issuance as a solid entrained vapor at the one end through line 7, the hot gasses are progressively cooled while the liquid is heated until it is transformed into vapor. The vapor traveling at extremely high velocities with centrifugal force will carry along the crystals formed as a result of the transformation of the liquid to vapor. The flow velocity will be sufficient to insure the entrainment of the crystals in somewhat the same manner as an air current carries dust particles, sand and other matter in proportion to air velocity. From the standpoint of evaporation, the assembly parallels a pneumatic transportation system. For proper operation, the flow is maintained at a velocity to insure entrainment of the formed crystals as determined by the cross-sectional dimension of the tubes, the rate of flow and the thermal expansion coefficient of the liquid and vapor whereby the velocity will increase some 600-fold as the liquid is transformed into vapor having about 600 times the volume as the liquid.

Suitable operation depends somewhat also on the centrifugal force provided by rotation of the rotor assembly. The turbo-generator operates without interference with the free flow of the material therethrough and without deposition of the formed salt solids on the interior surfaces of the tubular sections. In a commercial operation with a tubular section of about one meter in diameter, acceleration of at least 100 g. is obtained at about 420 r.p.m. or more. The rate of heat exchange will be somewhat proportional to the velocity.

Various changes and modifications may be made both in the novel separator unit of FIG. 2 and in the plant shown in FIG. 1, without departing from the scope of the invention. Thus said plant may include any desired purifying means for removing from the solution impurities other than the solute prior to introduction into the separator unit of FIG. 2. Also, the general flow sheet may well differ from that shown.

I claim:

1. The method of treating a solution to remove dissolved solids from the liquid in which the solids are dissolved comprising the steps of advancing the solution continuously through a series of outwardly and inwardly extending radial passageways of substantially constant cross-section while rotating said passageways at high speed about a central axis to provide a centrifugal force to the materials passing therethrough during outward movement and centripetal force during inward movement, supplying heat to said passageways for heat exchange relationship with the material passing therethrough and at a temperature above the vaporization temperature for the liquid whereby the liquid is vaporized before issuance from the passageways with corresponding increase in volume responsive to the conversion of liquid to vapor thereby markedly to increase the flow rate through the latter portions of the passageways wherein vaporization occurs such that the solid particles separating from solution remain entrained within the vapor for issuance in admixture with the vapors from the passageways, separating the solids from the vapor, removing the separated solids to yield a relatively pure vapor and condensing the vapor to produce a purified liquid.

2. The method as claimed in claim 1 in which the vapor is condensed by passing the vapor in heat exchange relationship with the solution prior to treatment for transfer of heat of condensation from the vapor to the solution to pre-heat the solution.

3. The method as claimed in claim 1 in which the solution is a solution of salt and water.

4. The method of claim 3 in which the solids separation is accomplished centrifugally.

5. The method as claimed in claim 1 in which the water vapors are condensed by passage in heat exchange relationship with the salt water to preheat the salt water prior to introduction into the passageways and to condense the water vapor.

6. The method as claimed in claim 1 in which the heat is passed in countercurrent flow to the direction of movement of the solution through the passageways.

7. The method as claimed in claim 1 which includes the step of generating the heat with gas burners and further includes passing the gases for the burners in indirect heat exchange relationship with the condensing vapors to preheat the gases.

8. A device for treatment of a liquid solution to separate the liquid from the solids dissolved therein comprising a tubular vessel mounted for rotational movement about its axis, transverse partitioning members dividing the interior of the tubular vessel into a plurality of adjacent axially aligned compartments, fluid flow passages interconnecting each pair of adjacent compartments comprising radially extending U-shaped tubular members having an inlet at one inner end communicating with one compartment of the pair and an outlet at the other inner end communicating with the other compartment of the pair, said passageways being of substantially uniform cross-section throughout the vessel, means for introducing liquid solution under positive pressure into one end of the tubular member for the continuous flow of liquid solution therethrough and outlet means at the other end of the tubular vessel, means for rotating the tubular vessel and tubular members together at high speed whereby centrifugal force is imparted to the liquid during flow outwardly through the tubular members and centripetal force is imparted thereto during flow inwardly through the tubular members, means for heating the vessel and tubular members to a temperature above vaporization temperature for the liquid whereby liquid is gradually converted to vapor during passage through the tubular vessel with corresponding increase in volume of material flowing through the passages to effect corresponding increase in flow rate such that the solid particles separating from solution remain suspended within the vapor and flow as a mixture of vapor and solids from the vessel, a separator for the separation of solids from vapor, means communicating the separator with the outlet of the tubular vessel and means for removal of separated solids from the separator.

9. A device as claimed in claim 8 in which the separator is a rotating centrifugal separator.

10. A device as claimed in claim 8 which includes a condenser, means communicating the condenser with the separator for passage of purified vapors from the separator to the condenser, and means for removing condensed liquid from the condenser.

11. A device as claimed in claim 10 which includes means communicating the condenser with the inlet to the tubular vessel for the passage of solution through the condenser in heat exchange relationship with the condensing vapors to pre-heat the solution.

References Cited

UNITED STATES PATENTS

| 615,329 | 12/1898 | Whiteley | 159—25 X |
| 1,156,851 | 10/1915 | Pfouts | 159—25 X |
| 1,994,009 | 3/1935 | Vorkauf | 159—6 |
| 2,710,057 | 6/1955 | Bassettetal | 159—2 X |

FOREIGN PATENTS

| 189,729 | 6/1937 | Switzerland. |
| 35,237 | 9/1885 | Germany. |
| 410,257 | 5/1934 | Great Britain. |
| 667,359 | 10/1929 | France. |
| 854,371 | 11/1960 | Great Britain. |

NORMAN YUDKOFF, *Primary Examiner.*

J. SOFER, *Assistant Examiner.*